United States Patent
Clifford et al.

(10) Patent No.: US 6,382,961 B2
(45) Date of Patent: *May 7, 2002

(54) MICROPROCESSOR-CONTROLLED GAS APPLIANCE UTILIZING A SINGLE ELECTRODE SPARK IGNITION SYSTEM

(75) Inventors: Todd W. Clifford, Liberty Township, OH (US); Jeffrey A. Benz, Covington, KY (US); Michael T. Mills, Milford, OH (US)

(73) Assignee: Convenience Technologies, Inc., Mason, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/840,587

(22) Filed: Apr. 23, 2001

Related U.S. Application Data

(63) Continuation of application No. 09/594,544, filed on Jun. 14, 2000, now Pat. No. 6,220,854, which is a division of application No. 09/109,797, filed on Jul. 2, 1998, now Pat. No. 6,116,230, which is a continuation-in-part of application No. 08/591,398, filed on Jan. 25, 1996, now Pat. No. 5,813,394, which is a continuation-in-part of application No. 08/283,992, filed on Aug. 1, 1994, now Pat. No. 5,617,840, which is a continuation-in-part of application No. 07/856,347, filed on Mar. 23, 1992, now Pat. No. 5,333,596.

(51) Int. Cl.$^7$ ................................. F23Q 3/00
(52) U.S. Cl. ................. 431/264; 431/258; 126/39 E; 361/253
(58) Field of Search ................. 431/258, 264, 431/266; 126/39 E, 39 BA, 39 R; 361/256, 257, 263, 253

(56) References Cited

U.S. PATENT DOCUMENTS

| | | |
|---|---|---|
| 3,289,801 A | 12/1966 | Jerkins |
| 3,292,821 A | 12/1966 | Cowley |
| 3,300,092 A | 1/1967 | Williams |
| 3,469,590 A | 9/1969 | Barker |
| 3,630,189 A | 12/1971 | Hodges et al. |
| 4,288,209 A | 9/1981 | Yoshinaga |
| 4,382,773 A | 5/1983 | Sobole |
| 4,805,587 A | 2/1989 | Schweitzer |
| 5,003,960 A | 4/1991 | Hanagan |
| 5,033,449 A | 7/1991 | Hanagan |
| 5,044,520 A | 9/1991 | Moisan |
| 5,052,174 A | 10/1991 | Bak |
| 5,163,358 A | 11/1992 | Hanagan et al. |
| 5,169,303 A | * 12/1992 | Paluck ................. 431/74 |
| 5,333,596 A | 8/1994 | Clifford |
| 5,388,984 A | 2/1995 | Meslif |

(List continued on next page.)

FOREIGN PATENT DOCUMENTS

| | | |
|---|---|---|
| EP | 800040 | 10/1997 |
| GB | 2 099 607 | 12/1982 |
| GB | 2 109 603 | 6/1983 |
| GB | 2155222 A | * 9/1985 |
| JP | 213740 | 10/1985 |

Primary Examiner—Sara Clarke
(74) Attorney, Agent, or Firm—Wood, Herron & Evans, L.L.P.

(57) ABSTRACT

The present invention is a gas appliance utilizing a single electrode spark ignition system. The gas appliance comprises two common ground planes, a conductive piece, a spark ignition device, and a P-N junction device. The conductive piece, e.g., a burner, a chassis, or a metal plate adjacent to the burner, is grounded to a first common ground plane. The spark ignition device has an electrode, and it is grounded to a second common ground plane. The spark ignition device is adapted to generate a spark between the electrode and the conductive piece to ignite the fuel. The P-N junction device is adapted to isolate the second common ground plane from the first common ground plane. As a result, the design prevents transient voltage spikes caused by the spark ignition device from interfering with the normal operation of the control circuitry of the gas appliance.

3 Claims, 2 Drawing Sheets

U.S. PATENT DOCUMENTS

| | | | |
|---|---|---|---|
| 5,503,550 A | * | 4/1996 | DePalma .................... 431/125 |
| 5,544,856 A | | 8/1996 | King et al. |
| 5,590,642 A | | 1/1997 | Borgeson et al. |
| 5,594,616 A | | 1/1997 | Brecht et al. |
| 5,617,840 A | | 4/1997 | Clifford |
| 5,813,394 A | | 9/1998 | Clifford |
| 5,931,655 A | * | 8/1999 | Maher, Jr. .................... 431/14 |
| 6,126,435 A | * | 10/2000 | Fredin-Garcia et al. ....... 431/14 |
| 6,220,854 B1 | * | 4/2001 | Clifford et al. ............. 431/264 |

* cited by examiner

MICROPROCESSOR-CONTROLLED GAS APPLIANCE UTILIZING A SINGLE ELECTRODE SPARK IGNITION SYSTEM

This application is a continuation of Ser. No. 09/594,544, filed on Jun. 14, 2000, now U.S. Pat. No. 6,220,854, which is a Division of Ser. No. 09/109,797, filed on Jul. 2, 1998, now U.S. Pat. No. 6,116,230, which is a continuation-in-part of Ser. No. 08/591,398, filed on Jan. 25, 1996, now U.S. Pat. No. 5,813,394, which is a continuation-in-part of Ser. No. 08/283,992, filed on Aug. 1, 1994, now U.S. Pat. No. 5,617,840, which is a continuation-in-part of Ser. No. 07/856,347, filed on Mar. 23, 1992, now U.S. Pat. No. 5,333,596.

FIELD OF THE INVENTION

The present invention relates generally to systems for igniting fuel and, more particularly, to a spark ignition apparatus for a gas appliance.

BACKGROUND OF THE INVENTION

Gas appliances have not extensively used direct spark ignition systems on appliances using microprocessor-based electronic controls to ignite burners because the transient electrical pulses or voltage spikes from known single probe spark ignition systems may undesirably interfere with electronic circuits.

Fuel-connected appliances may comprise a spark ignition system to ignite fuel at a burner. In known single electrode spark ignition systems for appliances, fuel emanates from a burner that is typically grounded to the chassis of the appliance. The chassis, however, may not be properly grounded. For example, the chassis of an appliance may be resting on nonconductive plastic or rubber wheels, or the chassis may be resting on a nonconductive surface such as wood. In order to ignite the fuel, a voltage potential difference is generated between an electrode and the burner. The voltage potential difference may be in the range of 12,000 to 20,000 volts. Consequently, a 12,000 to 20,000 volt ignition spark is generated between the electrode and the burner. An ignition spark of this magnitude may cause transient electrical pulses or voltage spikes to undesirably interfere with the performance of electronic circuitry of the appliance. For instance, the transient electrical pulses or voltage spikes may interfere with the performance of a microprocessor-based or microcontroller-based control circuit of an appliance. The transient electrical pulses or voltage spikes may also reset a microprocessor power supply that typically operates at 5 volts. In addition, the transient electrical pulses or voltage spikes may damage components of electric circuitry, may cause a microprocessor or microcontroller to incorrectly process information, and/or may cause electronic circuitry to lockup or crash.

Due to the shortcomings of known single electrode spark ignition systems when used in conjunction with electronic circuitry, manufacturers of appliances have instead used dual electrode spark ignition systems, hot surface igniters to ignite fuel, and single electrode spark ignition systems with a discrete spark module control isolated from the main microprocessor-based electronic control system. U.S. Pat. Nos. 5,003,960 and 5,033,449 disclose embodiments of a dual electrode spark ignition system. In a dual electrode spark ignition system, a spark is caused to jump from one electrode to another electrode, rather than from one electrode to chassis ground.

In order to prevent transient electrical pulses or voltage spikes from interfering with electronic circuitry, both electrodes of a dual electrode spark ignition system are heavily isolated from chassis ground and the electronic circuitry. For example, U.S. Pat. Nos. 5,003,960 and 5,033,449 utilize a ceramic insulating material to isolate the electrodes. Nevertheless, water, food, grease, or other conductive materials may gather on the insulating materials and short the electrodes to chassis ground and/or the electronic circuit. In addition, cracks may develop in the insulating material. As a result, water, food, grease, or other conductive materials may enter the cracks and short the electrodes to chassis ground and/or the electronic circuitry.

On the other hand, a hot surface igniter may not interfere with the functions of a microprocessor or other electronic circuitry. For example, appliance controls like those to companies such as the General Electric Company, Louisville, Ky., utilize hot surface igniters like those manufactured by Norton Company, Milton, N.H., and such igniters may have three significant shortcomings. First of all, the igniter elements may be made of silicon carbide or other similar fragile materials that may easily break or be damaged during shipment. Secondly, hot surface igniters may have a high field failure rate due to the igniter's elements burning out. Lastly, hot surface igniters may cost approximately seven times more than a single electrode spark igniter which Is adapted for use in gas cooktops and the surface burners of ranges. Using hot surface igniters, for example, on all four surface burners of gas cooktops or ranges would be too costly and too prone to field failures.

In light of the shortcomings of the above-mentioned systems, a need exists for a reliable and less expensive single electrode spark ignition system that does not damage or interfere with the performance of electronic circuitry.

SUMMARY OF THE INVENTION

The present invention provides a spark ignition system for a gas appliance. The spark ignition system of the present invention is less expensive and more durable and reliable than known gas appliance ignition systems, The spark ignition system of the present invention has microprocessing and digital electronic circuits that are not affected by the high voltage sparks required to ignite the fuel. The spark ignition system of the present invention is especially useful over a wide range of gas appliances.

According to the principles of the present invention and in accordance with the preferred embodiments, the invention provides an apparatus having a gas appliance with a burner that emanates fuel for ignition. A spark ignition control has a first common ground plane, a conductive piece disposed adjacent the burner and grounded to the first common ground plane, and a second common ground plane. The spark ignition control further has an electrode disposed in a spark generating relationship to the conductive piece to ignite the fuel, and a P-N junction device electrically connected between the first and second common ground planes. An N-section of the P-N junction device is connected to the first common ground plane, a P-section of the P-N junction device is connected to the second common ground plane.

In an alternative embodiment, the present invention provides an apparatus having a gas appliance with a burner that emanates fuel for ignition. A spark ignition control has only one electrode disposed in a spark generating relationship with the burner to ignite the fuel. The spark ignition control has microprocessing electronic circuits electrically connected to a first common ground, and a high voltage spark circuit electrically connected to a second common ground having an electrical potential different from the first common ground.

DETAILED DESCRIPTION OF THE INVENTION

Figure 1:
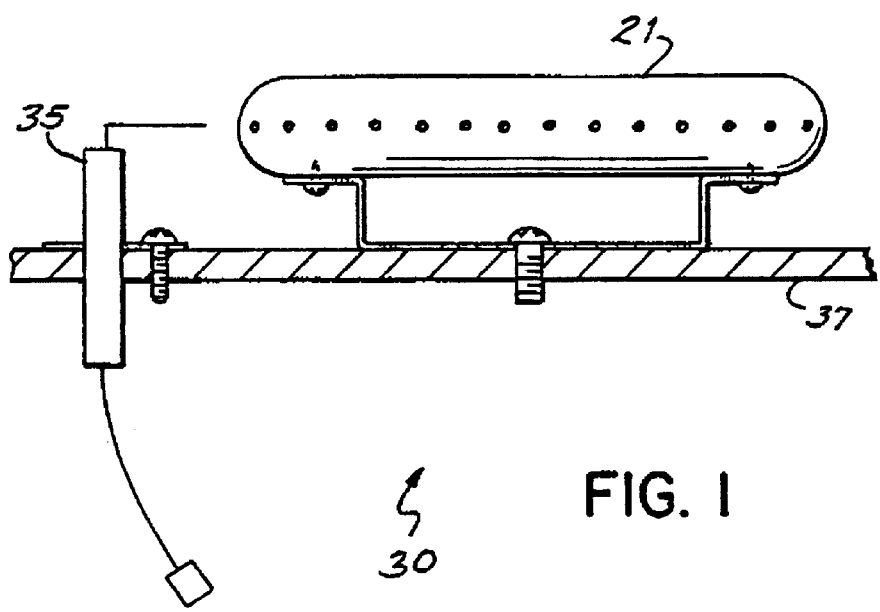
FIG. 1 is a partial cross-sectional view of a gas appliance in which a single electrode spark igniter sparks directly to a burner in accordance with the principles of the present invention.
Figure 3:
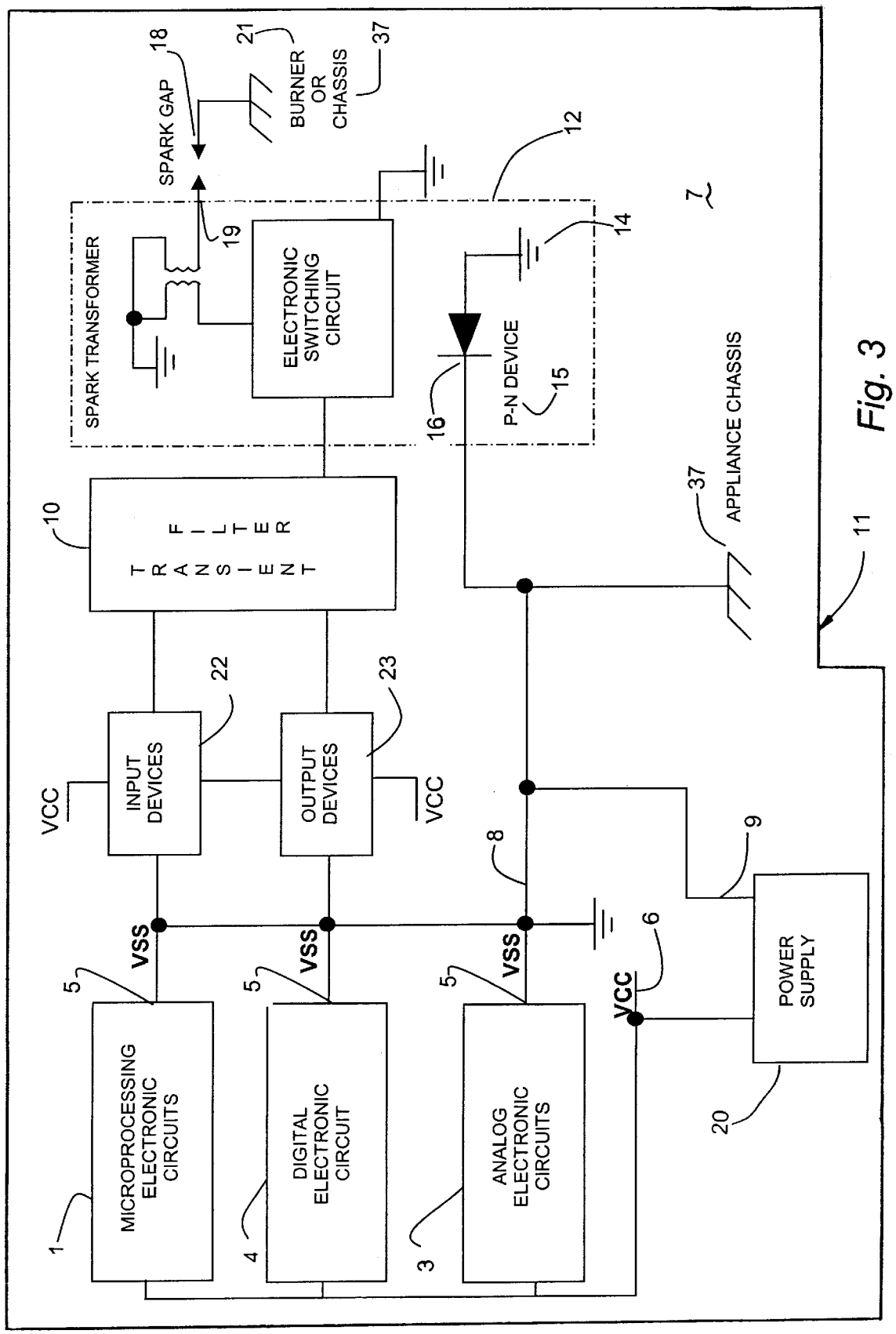
FIG. 3 is a schematic diagram of an embodiment of a single electrode spark ignition system in accordance with the principles of the present invention.

Referring to FIGS. 1 and 3, a gas appliance 30 includes in part a single electrode 35 mounted adjacent a burner 21 that is grounded to the chassis 37. The electrode 35 is electrically connected to a high voltage output 19 of a spark ignition control 11. During an ignition event, the spark ignition control 11 develops a high potential between the single electrode 35 and the burner 21. The high potential causes an arc or spark to jump from the electrode 35 to the burner 21, thereby igniting fuel emanating from the burner 21.

Figure 2:
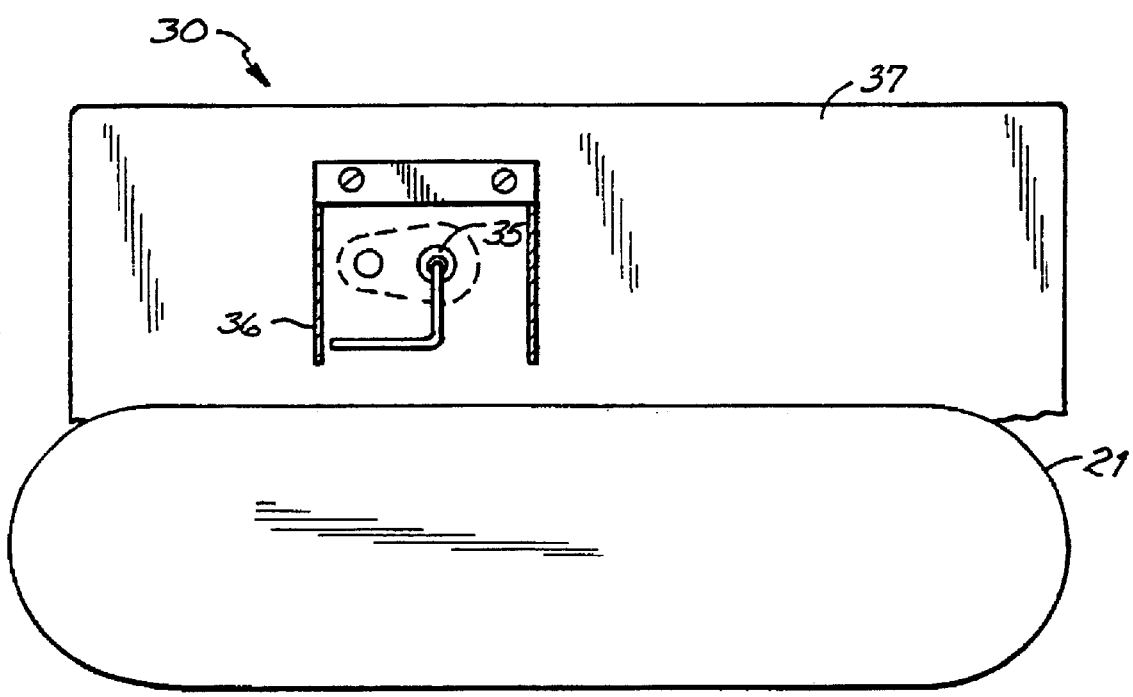
FIG. 2 is a partial top plan view of a gas appliance in which a single electrode spark igniter sparks directly to a metal plate adjacent to a burner in accordance with the principles of the present invention.

Referring to FIGS. 2 and 3, in an alternative embodiment, the gas appliance 30 has the burner 21 grounded to a metal plate 36 adjacent to the burner 21. Again, the electrode 35 is electrically connected to a high voltage output 19 of a spark ignition control 11. During an ignition event, the spark ignition control 11 develops a high potential between the single electrode 35 and the metal plate 36. The high potential causes an arc or spark to jump from the electrode 35 to the metal plate 36, thereby igniting fuel emanating from the burner 21.

The ignition event is created by a spark ignition control 11 shown in FIG. 3. The spark ignition control 11 is comprised in part of microprocessing circuits 1, analog electronic circuits 3, digital electronic circuits 4 and a power supply 20. The power supply 20 provides a VSS ground on an output 9, and that VSS ground is provided over a first ground plane 8 to VSS ground inputs of circuit components within the circuits 1, 3 and 4. It is known that the circuits 1, 3 and 4 are sensitive to electrical noise, for example, a voltage spike of only about 1 volt on the VSS ground terminal 9 can cause an operational fault in any of the circuits 1, 3 and 4. The power supply 20 provides a supply voltage, VCC, on an output 6, and that VCC supply voltage is provided to VCC inputs of the circuits 1, 3 and 4. Further, a voltage spike of about 600 millivolts above the power supply VCC output 6 also can cause an operational fault in any of the circuits 1, 3 and 4.

Therefore, for reliable operation of the circuits 1, 3 and 4, a transient electromagnetic pulse emanation standard ("TEMPEST") design is 30 implemented that includes input and output filtering of the electronic circuits that are susceptible to voltage spikes as described above. Voltage spikes may interfere with normal operation of electronic circuitry and/or may destroy electronic components in electronic circuitry.

A TEMPEST design requires that a properly designed printed circuit board 7 use proper grounding design techniques. To prevent voltage spikes on the VSS ground, all of the components within the circuits 1, 3 and 4 have respective VSS ground pins 5 connected to the ground plane 8. Further, each of the VSS ground pins 5 in the circuits 1, 3 and 4 should be connected to the ground plane 8 at a single point. In addition, the VSS ground pins of the integrated circuits 1, 3, 4 should be connected to the VSS ground terminal 9 of the power supply 20 through the widest and shortest path on the ground plane 8.

At times, the inputs and outputs of the circuits 1, 3, and 4 are at a high impedance state and are filtered by a transient suppression filter 10. The filter 10 normally has a time constant of about 5–10 times longer than the rise band fall times of the voltage spikes. This time constant helps to insure the suppression of the voltage spikes.

The VSS ground of the spark ignition control 11 is separated from and not connected to a common ground 14 of the high voltage spark circuit 12. The common ground 14 of the spark circuit 12 is isolated from the common ground 8 of the spark ignition control 11 by a P-N junction device 15. The P-N junction device 15 is connected in a forward biased mode, that is, an N side 16 of the device is connected to the ground plane 8 of the spark ignition control 11. This raises the common ground 14 of the spark circuit 12 above the spark ignition common ground 8 and allows the single point on the ground plane 8 to remain intact. Therefore, all of the VSS grounds in the spark ignition control 11 can be connected to the chassis ground 37 at this single point.

The spark ignition control 11 also includes input devices 22 that may be any devices for providing an input command or state, for example, switches, a keypad, thermocouple, etc. The spark ignition control 11 also includes output devices 23 that may be any devices for providing an output command or state, for example, audio or visual displays, etc. The input and output devices 22, 23 also have grounds connected to the common ground plane 8.

In normal operation, a high voltage output 19 of the spark circuit 12 provides arcs or sparks across a gap directly to chassis ground 37, a burner 21 that is electrically connected to chassis ground 37, or a receptor 18 that is electrically connected to the chassis ground 37. The receptor 18 may be a metal plate 36 (FIG. 2) that is electrically connected to chassis ground 37 near the burner 21. With the isolation provided by the P-N junction device 15, the high voltage sparks across the gap do not interrupt or destroy any components in the electronic circuits 1, 3 and 4.

While the present invention has been illustrated by a description of various embodiments and while these embodiments have been described in considerable detail, there is no intention to restrict or in any way limit the scope of the appended claims to such detail. Additional advantages and modifications within the spirit and scope of the invention will readily appear to those skilled in the art.

Therefore, the invention in its broadest aspects is not limited to the specific details shown and described. Consequently, departures may be made from the details described herein without departing from the spirit and scope of the claims that follow.

What is claimed is:

1. An apparatus comprising:
    a gas appliance having a burner adapted to emanate fuel for ignition; and
    a spark ignition control comprising
        a first common ground plane,
        a conductive piece grounded to the first common ground plane and disposed adjacent the burner,
        a second common ground plane,
        an electrode disposed in a spark generating relationship to the conductive piece to ignite the fuel, and
        a P-N junction electrically connected between the first and second common ground planes, the P-N junction having a N-section connected to the first common ground plane and a P-section connected to the second common ground plane.

2. The apparatus of claim 1 further comprising a chassis grounded to the first common ground plane.

3. An apparatus comprising:

a gas appliance having a burner adapted to emanate fuel for ignition; and a spark ignition control comprising only one electrode disposed in a spark generating relationship with the burner to ignite the fuel, microprocessing electronic circuits electrically connected to a first common ground, and a high voltage spark circuit electrically connected to a second common ground having an electrical potential different from the first common ground.

* * * * *